Feb. 20, 1945.   O. W. SCHOTZ   2,369,861
SYNCROMESH TRANSMISSION
Filed May 27, 1943   2 Sheets-Sheet 1

INVENTOR
Otto W. Schotz
BY
Harness, Dickey, Pierce & Harris
ATTORNEYS

Feb. 20, 1945.   O. W. SCHOTZ   2,369,861
SYNCROMESH TRANSMISSION
Filed May 27, 1943   2 Sheets-Sheet 2

INVENTOR
Otto W. Schotz
BY
Harness, Dickey, Pierce & Harris
ATTORNEYS

Patented Feb. 20, 1945

2,369,861

UNITED STATES PATENT OFFICE 2,369,861

SYNCHROMESH TRANSMISSION

Otto W. Schotz, Detroit, Mich., assignor to Chrysler Corporation, Highland Park, Mich., a corporation of Delaware Application May 27, 1943, Serial No. 488,692

9 Claims. (Cl. 192—53)

This invention relates to change speed transmissions and more particularly to improvements in synchromesh mechanisms for use therein.

An object of the invention is the provision of improvements in synchronous clutch mechanisms for blocking clutching action when the parts to be clutched are operating at different speeds and which will accommodate clutching when the parts are operating at approximately the same speed; and to provide a mechanism adapted to effect approximate synchronization of the parts to be clutched prior to the clutching engagement.

Another object of the invention is the provision of an improved mechanism which is bi-directional in its control of the parts adapted to be selectively clutched; and more specifically, the invention contemplates improvements in a power transmission comprising relatively rotatable torque transmitting structures and a clutching body shiftable to selectively clutch therewith, each of the structures having a blocker associated therewith movable between positions respectively blocking and allowing clutching engagement and wherein disposition of said blockers in the aforesaid positions is assured, particularly as the shiftable body is shifted to declutch one of the structures and clutch the other thereof.

Other objects of the invention will be more apparent from the following description taken in connection with the accompanying drawings, in which.

Figure 1:
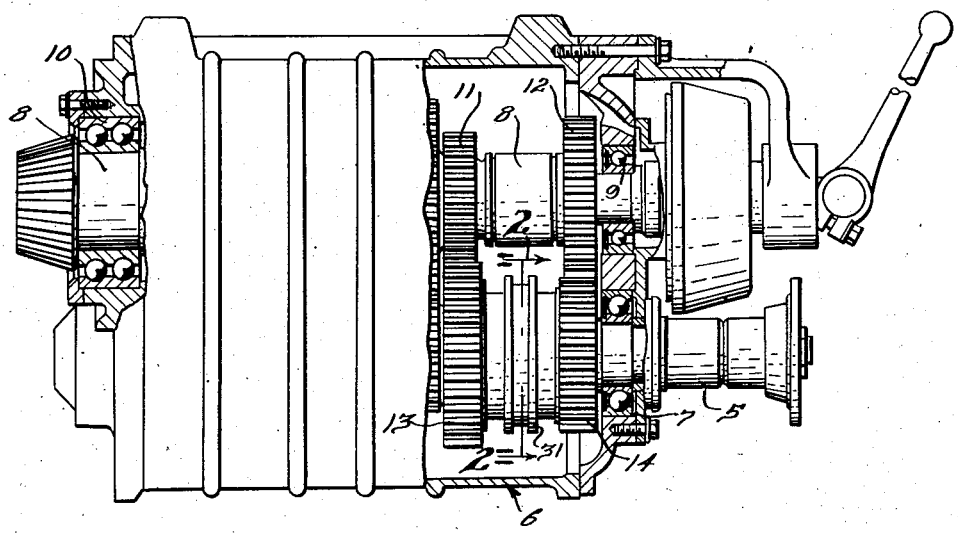
Fig. 1 is a side elevational view, partly in section, of a change speed power transmission embodying the invention.

Referring to the drawings, the invention is illustrated in connection with a power transmission of the type having a plurality of speed ratio drives. The transmission illustrated in Fig. 1 includes an input shaft 5 journalled in a casing structure 6 by bearing units, one of which is shown at 7, and adapted to be driven by a power unit, preferably through the medium of a clutch, not shown. An output shaft 8 is journalled in the casing 6, as at 9 and 10, and has a plurality of driven gears, including the gears 11 and 12 of relative different diameters rotatable therewith and respectively in constant mesh with driving gears 13 and 14 of relatively different diameters which are rotatably journaled on the shaft 5 as more particularly shown in Fig. 3.

The invention is illustrated in connection with the means for selectively drivingly connecting the gears 13 and 14 with the input shaft 5 for transmitting different speed ratio drives to the output shaft 8. The gear 13 has an internal friction face 15 in the form of a portion of a cone and the gear 14 has a similar friction face 16. Corresponding sets of clutch teeth 17 and 18 are rotatably carried by the gears 13 and 14, respectively. Splined on the shaft 5 is an axially stationary hub 19 having external teeth meshing with internal teeth of a sleeve 20 as more particularly shown in Figs. 2 and 3, the sleeve 20 being adapted for axial shift to selectively positively clutch the teeth thereof with the sets of teeth 17 and 18.

Figure 3:
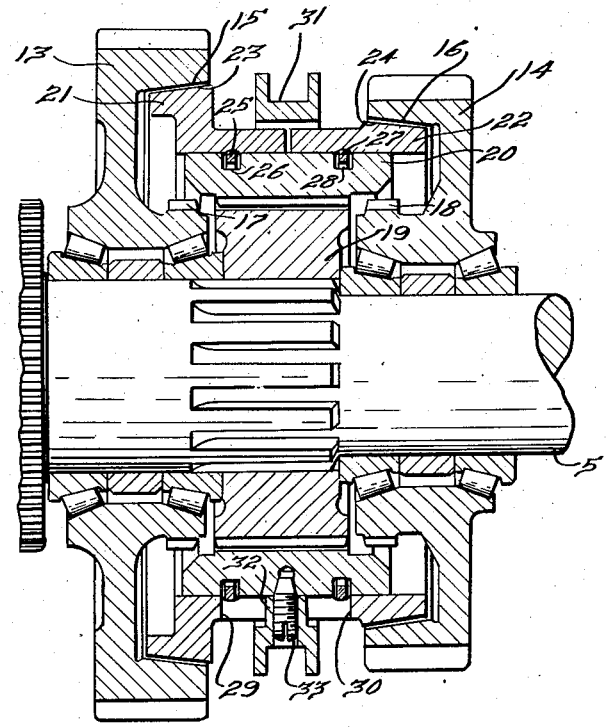
Fig. 3 is a sectional side elevational view taken on the line 3—3 of Fig. 2.

A blocking and synchronizing section is rotatably connected with the clutching sleeve 19 as will hereinafter more fully be set forth and includes the annular members 21 and 22 respectively associated with the gears 13 and 14. The member 21 has a friction face 23 in the form of a cone registering with the friction face 15 of the gear 13 and the member 22 has a similar friction face 24 registering with the friction face 16 of the gear 14. As shown in Fig. 3 the member 21 is releasably connected with the sleeve 20 for limited shift therewith by a detent in the form of a snap ring 25 carried in a notch 26 of the sleeve and having an arcuately contoured face engaging a correspondingly contoured notch in the inner periphery of the member 21. A similar connection between the member 22 and the sleeve 20 is provided by a second snap ring 27 carried in a second notch 28 of the sleeve 20 and engaged in a notch in the inner periphery of the member 21.

Figure 4:
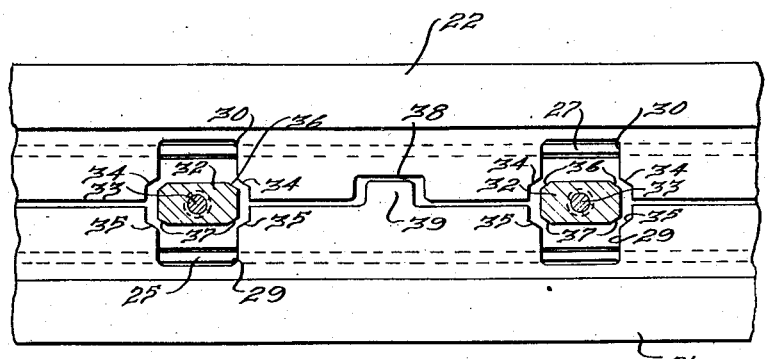
Fig. 4 is a fragmentary plan view partly in section taken as indicated by the line 4—4 of Fig. 2.

The member 21 has a plurality of circumferentially spaced axially extending slots 29 at the edge thereof adjacent the member 22 and the latter is provided with a plurality of similar slots 30 at the edge thereof adjacent the member 21 and respectively registering with the grooves 29 as shown in Fig. 4 for cooperating therewith as more fully hereafter set forth. While four pairs of such registering grooves are shown herein it will be understood that the number thereof may be varied within the limits of the invention.

Figure 2:
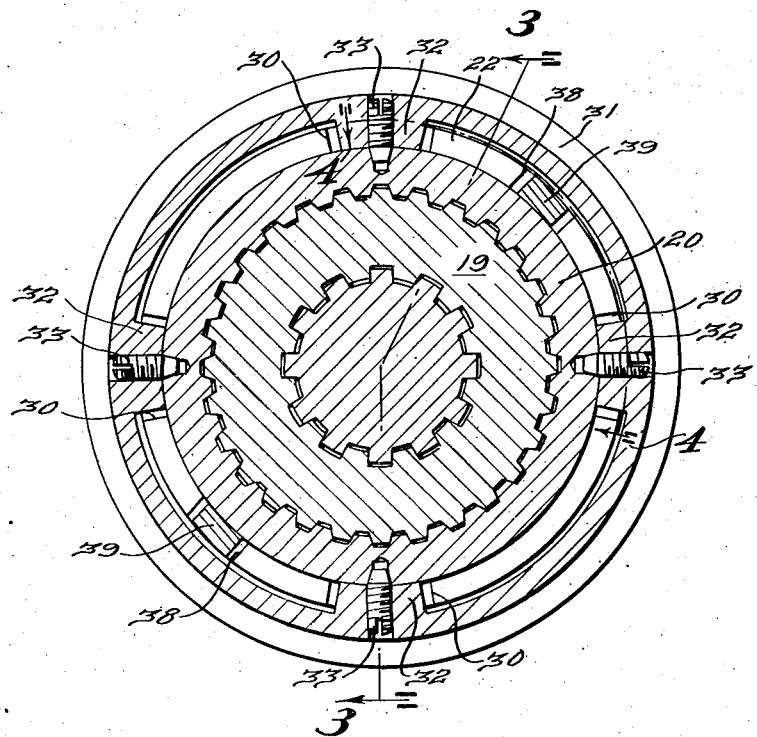
Fig. 2 is an enlarged transverse section taken as indicated by the line 2—2 of Fig. 1.

A shift member 31 for the sleeve 20 encircles the latter and the members 21 and 22 and has four radially inwardly extending projections 32 respectively registering with the pairs of associated slots 29, 30, as shown in Fig. 4, each projection being secured to the sleeve 20 by a screw 33 as shown in Fig. 2. The member 31 is formed with a channel, as shown in Fig. 3, adapted to receive a shift fork, not shown, of any suitable shifting mechanism. It will be understood that the projections cooperate with the slots 29, 30 respectively associated therewith to form a driving connection between the members 21 and 22, and as typified in Fig. 4, the entrance of each slot 29, 30 is so flared as to accommodate relative rotation of the sleeve 20 and the members 21 and 22 and relative rotation of the latter members as will hereafter appear. Each slot 30 includes a pair of opposed ramp-like cam walls 34 and each slot 29 has a similar pair of walls 35. The projections 32 are octagonal in cross section and include a first pair of shoulders 36 and a second pair 37.

The member 22 is provided with circumferentially spaced notches 38 and the member 21 has tongues 39 respectively disposed therein to rotatably connect the members 21, 22 for limited relative rotation to the extent of that provided by the projections 32 and pairs of slots 29, 30.

In the operation of the mechanism it will be understood that the output shaft 8 will be driven at relatively different speeds with respect to the input shaft 5 by selectively clutching the sleeve 20 with the gears 13 and 14. The sleeve 20 is shown in its neutral position and as a typical example of the operation of the mechanism let it be assumed that the shaft 8 is to be driven from the shaft 5 through the gears 12 and 14. The shaft 5 is declutched from the engine drive and the sleeve 20 is shifted to the right as viewed in Fig. 3, under an asynchronous condition with respect to the gear 14 and sleeve 20. By reason of the detent connection at 27 the member 22 is shifted to the right with the sleeve 20 to engage the friction faces 16 and 24 and due to the aforesaid asynchronous condition the member 22 and sleeve 20 are subjected to relative rotation so that one of the ramp-like walls 34 of each slot 30 is engaged by the adjacent shoulder 36 of the associated projection 32 to thereby block movement of the projections into the main body of the slots 39. Pressure applied to the engaged ramps 34 by the projections 32 forces the face 24 into frictional driving engagement with the face 16 to thereby produce a synchronous condition with respect to the sleeve 20 and gear 14 whereupon the member 22 and sleeve 20 are relatively rotated to thereby relatively align the projections 32 and the respective slots 30 for movement of the former into the latter, the connection at 27 releasing the member 22 from the sleeve 20 for relative axial shift of the latter to clutch with the set of teeth 18.

With the projections 32 disposed in the main body of the respective slots 30, the tongues 39 cooperating with their notches 38 serve to limit relative rotation of the members 21, 22, it being understood that the clearance between the tongues and respective notches is of the same value as that existing with respect to the projections 32 and slots 29, 30. The tongues 39, in cooperation with the notches 38 under the aforesaid condition, form the operating connection between the members 21, 22 and are positioned at one or the other of their extremes with respect to the associated notches so that the slots 29 are disposed in circumferentially offset relation with respect to the associated slots 30 and one or the other of the ramp-like walls 35 is positioned for engagement with a shoulder 37 of the projections to thereby block shift of the sleeve to clutch with the set of teeth 17 prior to the establishment of a synchronous relation between the shaft 5 and gear 13.

It will be understood that while I have described the above operation of shifting the sleeve as comprising a series of stages, the shifting movement in practice is substantially continuous and almost instantaneous as to the impression on the operator. In returning the sleeve from the aforesaid clutching position it will be understood that the clutched teeth are disengaged and the member 22 restored to the illustrated position with the detent 27 seated in the groove therein.

In the foregoing arrangement each blocker member is energized, by initial engagement of the associated pair of friction faces, for movement to blocking position independent of the other thereof, and the failure of one pair of these faces to release does not prevent timely engagement of the other pair to thereby energize the associated blocker. Thus the arrangement is an improvement over the one-piece blocker structure having non-rotatable friction faces and a continuous slot accommodating shift of the sleeve between its clutching positions wherein should one pair of the engaging faces fail to release the other pair thereof would not be timely engaged to move the blocking structure to a blocking position. In the illustrated embodiment centrifugal forces assist in energizing each of the blockers.

Although but one embodiment of the invention is herein shown and described, it will be understood that various changes in the size, shape and arrangement of parts may be made without departing from the spirit of my invention and it is not my intention to limit said invention other than by the terms of the appended claims.

I claim:

1. In a synchronizing transmission including relative torque transmitting members each having a set of clutch teeth and a friction face, a clutching means rotatable relative to said members and shiftable axially to selectively clutch therewith comprising a toothed clutching section adapted to selectively clutch with said sets of clutch teeth and a synchronizing structure rotatably connected with said clutching section including relatively axially movable synchronizing elements each having a friction face adapted to be urged into frictional driving engagement with one of the first mentioned friction faces and an axially extending slot, said clutching section including a projection selectively movable in said slots to accommodate said clutching shift, and a rotatable connection between said elements accommodating relative rotary movement therebetween whereby said elements are selectively positioned to engage with said projection to block clutching shift of said clutching section and establish frictional driving engagement between a pair of said faces, the rotatable connection between said structures accommodating relative rotation of the clutching section and blocking element when said driving engagement is established to allow completion of said clutching shift, said rotatable connection operating to limit relative rotation of said elements when said clutching section is clutched with one of said sets of clutch teeth.

2. In a synchronizing transmission including relative torque transmitting members each having a set of clutch teeth and a friction face, a clutching means rotatable relative to said members and shiftable axially to selectively clutch therewith comprising a toothed clutching section adapted to selectively clutch with said sets of clutch teeth and a synchronizing structure rotatably connected with said clutching section including relatively axially movable synchronizing elements each having a friction face adapted to be urged into frictional driving engagement with one of the first mentioned friction faces and an axially extending slot, said clutching section including a projection selectively movable in said slots to accommodate said clutching shift, one of said elements having an opening and the other thereof having a tongue disposed in said opening accommodating limited relative rotary movement of said elements whereby said elements are selectively positioned to engage with said projection to block clutching shift of said clutching section and establish frictional driving engagement between a pair of said faces, the rotatable connection between said structures accommodating relative rotation of the clutching section and blocking element when said driving engagement is established to allow completion of said clutching shift.

3. In a synchronizing transmission including relative rotatable torque transmitting members each having a set of clutch teeth and a friction face, a clutching means rotatable relative to said members and shiftable axially to selectively clutch therewith comprising a toothed clutching section adapted to selectively clutch with said sets of clutch teeth and a synchronizing structure rotatably connected with said clutching section including relatively axially movable synchronizing elements each having a friction face adapted to be urged into frictional driving engagement with one of the first mentioned friction faces and an axially extending slot, said clutching section including a projection selectively movable in said slots to accommodate said clutching shift, said rotatable connection accommodating relative rotary movement of said elements whereby the latter are selectively positioned to engage said projection to block clutching shift of said clutching section and establish frictional driving engagement between a pair of said faces and accommodating relative rotation of said clutching section and the blocking element when said driving engagement is established to allow completion of said clutching shift, and a connection between said elements limiting relative rotary movement thereof when said toothed section is clutched with either of said sets of teeth.

4. In a power transmission mechanism the combination of relatively rotatable torque transmitting structures each having a set of clutch teeth and a friction face rotatable therewith, a toothed body adapted for axial opposite shift to selectively clutch with said sets of clutch teeth, blocker members respectively associated with said structures each rotatably connected with said toothed body for movement relatively thereto between first and second position to respectively block and allow said clutching shift, each of said members having a friction face engageable with the friction face of the structure associated therewith thereby to effect said movement of said members, said rotatable connection releasing said members for relative rotation when said toothed body is clutched with either of said sets of teeth, and a connection between said members limiting relative rotation thereof when said toothed body is clutched with either of said sets of clutch teeth.

5. In a synchronizing mechanism the combination of relatively rotatable torque transmitting structures each having a friction face and a set of clutch teeth rotatable therewith, a toothed body adapted for shift to selectively clutchingly engage with said sets of clutch teeth, a pair of blocker members respectively associated with said structures, each rotatable with said toothed body and relative thereto between first and second positions respectively blocking and allowing said clutching shift, each of said members having a friction face engageable with the friction face of the structure associated therewith to effect said movement of said blocker members, said toothed body having a projection and each of said members having a slot adapted to receive said projection when the member is in its second position and a ramp at either side of the entrance of the slot adapted to engage the projection when the member is in its first position, and a positively acting connection between said members accommodating relative rotation thereof, said connection limiting relative rotary movement of said members when said projection is received in either of said slots as aforesaid.

6. In a synchronizing mechanism the combination of relatively rotatable torque transmitting structures each having a friction face and a set of clutch teeth rotatable therewith, a toothed body adapted for shift to selectively clutchingly engage with said sets of clutch teeth, a pair of blocker members respectively associated with said structures, each having a slot, a post rotatable with said toothed body engaged in said slots to form a driving connection between said toothed body and said members accommodating movement of each of said members relative to said toothed body between a first position cooperating with said projection to block said clutching shift and a second position relatively aligning its slot with said projection for receiving the latter to allow said clutching shift, each of said members having a friction face engageable with the friction face of the structure associated therewith to effect said movement of said blocker members, and a rotatable connection between said members limiting relative rotation thereof when said toothed body is clutched with one of said sets of teeth.

7. In a synchronizing mechanism the combination of relatively rotatable torque transmitting structures each having a friction face and a set of clutch teeth rotatable therewith, a toothed body adapted for shift to selectively clutchingly engage with said sets of clutch teeth, a pair of axially shiftable blocker members respectively associated with said structures rotatably connected with said toothed body for movement relative thereto to a position for blocking said clutching shift, each of said members having a friction face engageable with the friction face of the structure associated therewith to effect said movement of said blocker members, a releasable connection between said toothed body and each of said elements for axially shifting the latter to engage a pair of said faces in advance of clutching engagement of the toothed body with the teeth of the associated structure whereby to selectively move said members to said blocking position, said toothed body having a projection cooperating with said members when the latter are in blocking position to thereby block said clutching shift and operable to place the pair of engaged friction faces in synchronizing engagement in response to further clutching shift of said toothed body, said connection accommodating relative rotation of the toothed structure and each of said blocking members when said synchronizing drive is established to allow completion of the clutching shift, each of said members having a slot receiving said projection during completion of said clutching shift, one of said members having an opening therein and the other of said members having a tongue in said opening with rotative clearance therewith and operating to limit relative rotation of said members when said toothed body is clutched with one of said sets of clutch teeth.

8. In a synchronizing mechanism the combination of relatively rotatable torque transmitting structures each having a friction face and a set of clutch teeth rotatable therewith, a toothed body adapted for shift to selectively clutchingly engage with said sets of clutch teeth, a pair of axially shiftable blocker members respectively associated with said structures rotatably connected with said toothed body for movement relative thereto to a position for blocking said clutching shift, each of said members having a friction face engageable with the friction face of the structure associated therewith to effect said movement of said blocker members, a releasable connection between said toothed body and each of said elements for axially shifting the latter to engage a pair of said faces in advance of clutching engagement of the toothed body with the teeth of the associated structure whereby to selectively move said members to said blocking position, said toothed body having a projection cooperating with said members when the latter are in blocking position to thereby block said clutching shift and operable to place the pair of engaged friction faces in synchronizing engagement in response to further clutching shift of said toothed body, said connection accommodating relative rotation of the toothed structure and each of said blocking members when said synchronizing drive is established to allow completion of the clutching shift, each of said members having a slot receiving said projection during completion of said clutching shift, and means forming a lost motion connection between said members accommodating rotation thereof relative to said toothed body as aforesaid and operating to positively limit relative rotation of said members when said toothed body is clutched with either of said sets of teeth.

9. In a synchronizing mechanism the combination of relatively rotatable torque transmitting structures each having a friction face and a set of clutch teeth rotatable therewith, a toothed body adapted for shift to selectively clutchingly engage with said sets of clutch teeth, a pair of blocker members respectively associated with said structures, each having a slot, said slots opening one toward the other and each having a flared entrance, a radial projection rotatable with said toothed body operable when positioned in said flared entrances to form a rotatable connection between said toothed body and said members accommodating movement of each of said members relative to said toothed body between a first position cooperating with said projection to block said clutching shift and a second position relatively positioning the projection and slot of the blocking member for movement of the projection into the main body of the slot of the latter member to thereby allow completion of said clutching shift, and a connection between said members limiting relative rotation thereof when said projection is disposed in the main body of either of said slots.

OTTO W. SCHOTZ.